July 2, 1957  A. R. LIDBERG  2,797,466
IMPROVED MOULD FOR MOULDING CONCRETE POLES AND THE LIKE
Filed Aug. 22, 1952  5 Sheets-Sheet 2

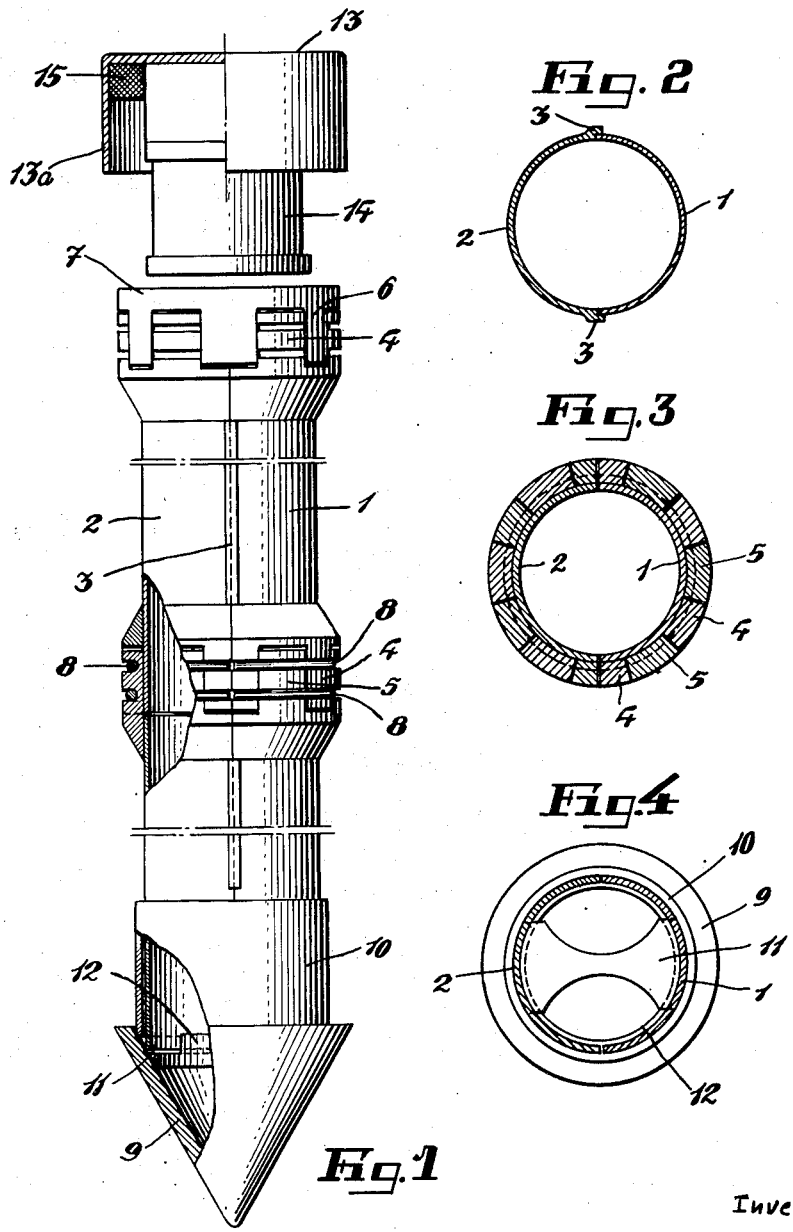

Inventor:
Artur Robert Lidberg,
By Cushman, Darby & Cushman
Attorneys.

July 2, 1957 — A. R. LIDBERG — 2,797,466
IMPROVED MOULD FOR MOULDING CONCRETE POLES AND THE LIKE
Filed Aug. 22, 1952 — 5 Sheets-Sheet 3

Inventor:
Artur Robert Lidberg,
By Cushman, Darby & Cushman
Attorneys.

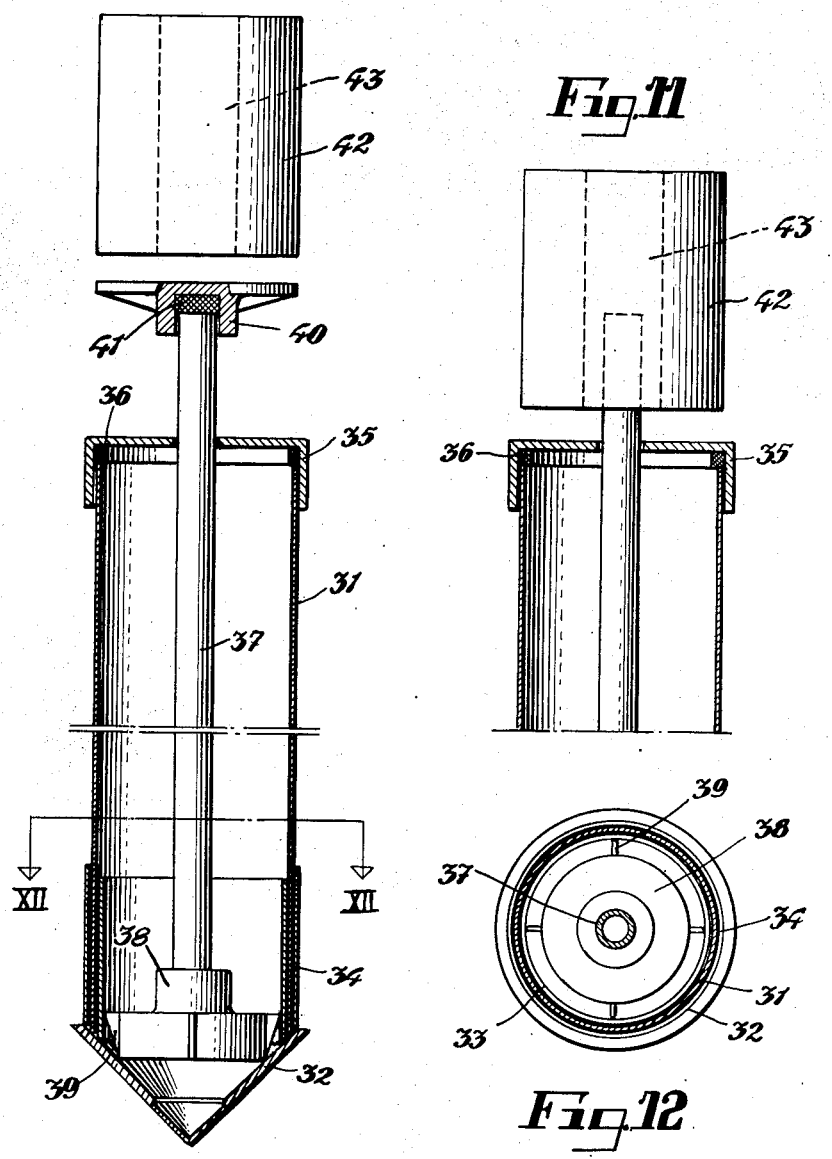

July 2, 1957 A. R. LIDBERG 2,797,466
IMPROVED MOULD FOR MOULDING CONCRETE POLES AND THE LIKE
Filed Aug. 22, 1952 5 Sheets-Sheet 5

Inventor:
Artur Robert Lidberg,
By Cushman, Darby & Cushman
Attorneys.

United States Patent Office 2,797,466
Patented July 2, 1957

2,797,466

IMPROVED MOULD FOR MOULDING CONCRETE POLES AND THE LIKE

Artur Robert Lidberg, Molnlycke, Sweden

Application August 22, 1952, Serial No. 305,898

Claims priority, application Sweden August 23, 1951

3 Claims. (Cl. 25—118)

The present invention refers to a device for moulding poles of concrete and the like for building purposes.

In order to reduce the costs for the poling of a building it has previously been proposed to mould the pole in the ground in its place in a mould like device which has been driven into the ground. For this purpose a tube provided with a loose point was driven into the ground to desired depth and thereafter filled with concrete. During the moulding the tube was successively drawn up, so that the surrounding ground material formed the mould for the concrete. This method, however, has certain risks, it being possible, that the pole will be surrounded in part by water veins, through which the binder in the concrete may be washed away. This method, however, has some important advantages, an expensive armature and the high transporting costs for the poles being avoided.

This invention has for its purpose to eliminate the risks combined with the method indicated and comprises a process for moulding poles for building purposes or the like and consists essentially in moulding the material in a tubular mould, driven down into the ground at the location of the pole to be moulded, said mould being composed of two or more portions disposed axially, said mould portions being drawn up after the hardening of the concrete preferably one at a time. Hereby the moulding will be performed in a real casting mould, which is removed first after the concrete has hardened.

The invention also comprises a mould for performing the above process, different embodiments of such moulds being illustrated in the accompanying drawings, in which:

Fig. 1 is a side elevation of a mould for the moulding of poles according to the invention.

Figs. 2, 3 and 4 are sections along the lines II—II, III—III and IV—IV respectively in Fig. 1.

Fig. 10 is a longitudinal section through a mould in a certain stage of its driving down into the ground.

Fig. 11 shows parts of the same device at another stage of the poling.

Fig. 12 is a section along line XII—XII in Fig. 10.

Figure 13:
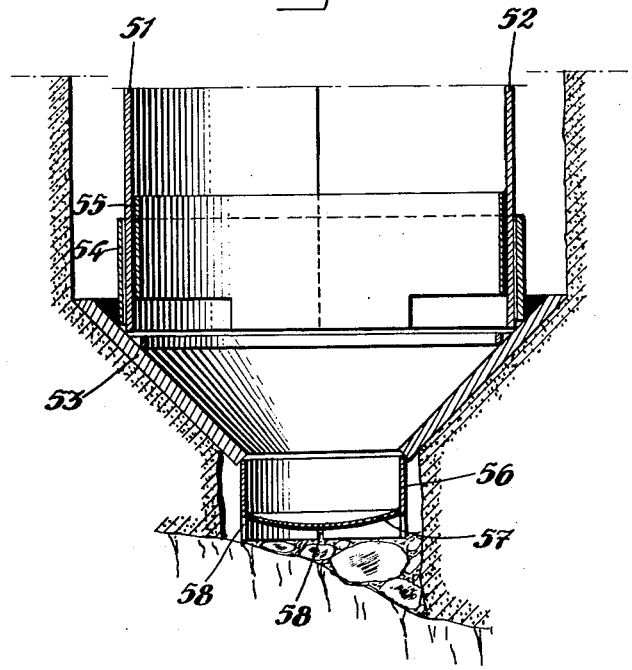
Figure 14:
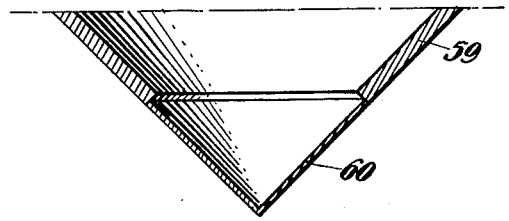

Figs. 13 and 14 finally show two different embodiments of mould points according to the invention.

As illustrated in Figs. 1 to 4 the mould is composed of two semicylindrical portions or halves 1 and 2 of which the portion 2 has axially disposed flanges 3 engaging the edges of the other portion 1. In the embodiment shown each of the portions 1 and 2 is in its longitudinal direction composed of two elements, of which the upper one at both ends is formed with clawlike members 4, adapted to co-operate with corresponding claws 5 and 6 respectively on the lower element and on a head portion 7. The claws 4 and 5 are provided with peripheral grooves, engaged by semicircular locking members 8 locking together the different mould portions disposed in the prolongation of each other. The head portion 7, however, is only loosely placed on top of the mould.

The lower elements 1 and 2 have plain smooth lower edges and are inserted in a conical mould point 9, having a tubular portion 10 for guiding the semicylindrical halves 1 and 2. These abut with their lower edges against a washer or plate 11 inserted into the mould point 9, said plate 11 being preferably made of resilient material. Within the mould point there are further arched guidings 12 at the joint between the both mould halves 1 and 2.

The mould is adapted to be driven down into the ground by means of a pile driver or the like and is for this purpose provided with a hat member 13, having a cylindric guide portion 14 adapted for introduction into the mould. In Fig. 1 the hat member 13 is shown in a position extracted from the mould but in its working position a cylindrical collar 13a projecting downwardly from the upper end of the hat member encloses the upper ends of both mould halves 1 and 2 and the head portion 7. The hat member 13 further comprises a packing 15 of lead or like material.

Figure 6:
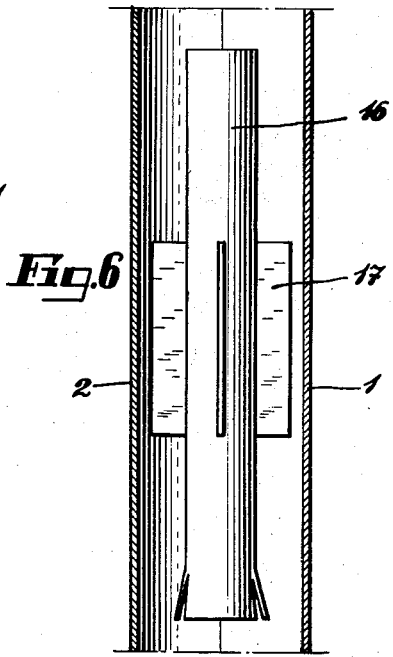
Figs. 6 and 7 show a longitudinal section and a cross section through a part of the mould.
Figure 5:
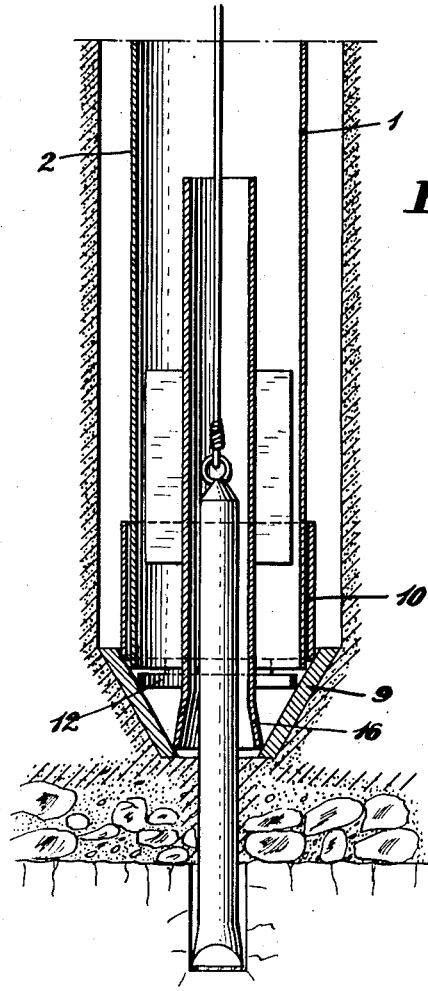
Fig. 5 is a longitudinal section through the lower part of a mould according to Fig. 1 in a certain stage of the poling work.
Figure 7:
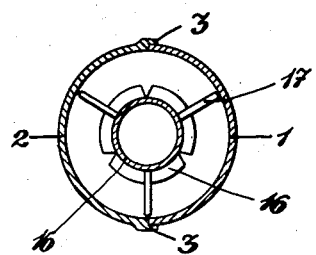

From the preceding it is clear, that the mould during the driving operation can be prolongated by further elements. Often the ground is so constituted, that the pole with its lower end rests on rock. It is then advantageous to lock the point of the pole in relation to the rock as shown in Fig. 5.

When the mould point 9 reaches the rock ground, the driving is finished, whereafter the washer 11 is removed by appropriate means. This can be done by lowering a tonglike gripping tool through the mould, by gripping the middle portion of the washer 11 by means of this gripping tool and by drawing up the washer which because of its resiliency will bend and slide with its end portions along the inside of the elements 1 and 2. Thereafter a load of heat developing powder is placed at the bottom of the mould and ignited in a known manner so as to melt or burn down the pointed end portion of the mould point 9. Thereafter a guide tube 16 is lowered into the mould tube, said guide tube having radial flanges 17 to guide it along the inner sides of the mould and to maintain the guide tube in a centered position. With its lower end edge, which is preferably somewhat widened, the guide tube 16 rests against the inside of the actually truncated cone of the point member 9. Thereafter a boring tool 18 is lowered into the guiding tube, by means of which the underlying rock ground can be bored to form a bore hole as shown in Fig. 5.

Figure 8:
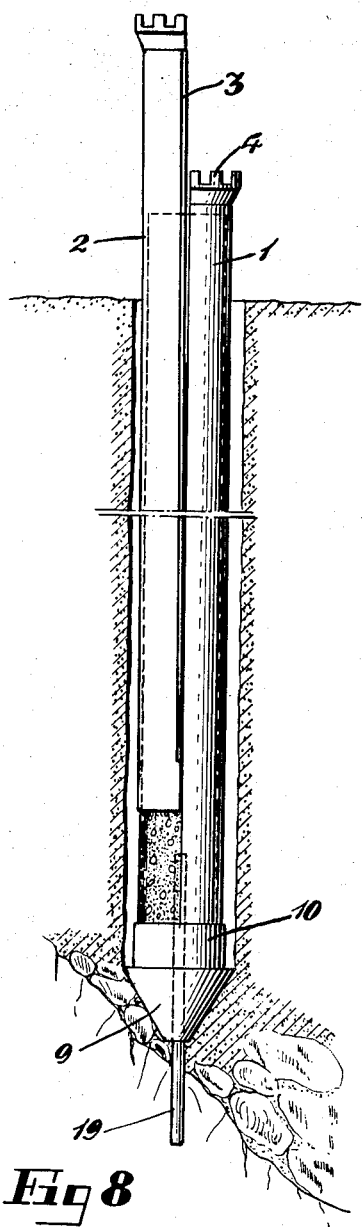
Fig. 8 is a side view of a mould after the moulding process has been performed.

When the hole in the rock ground has reached the desired depth, the bore 18 is lifted out and a locking pin 19 is inserted into the hole, said locking pin 19 having such a length, that it projects upwardly into the mould (Fig. 8). Thereafter the guiding tube 16 is also lifted out from the mould before being driven into the ground, the mould sections coated with fat on their inner sides so as to prevent the concrete from fastening against the walls of the mould, but if desired the coating may be applied in this stage of the poling process by means of appropriate tools, whereafter the casting of the concrete is performed. Especially when greater depths are concerned it may be appropriate for pouring the concrete mass into the mould to use a preferably cylindrical container having a releasable bottom portion, said container being filled with concrete and lowered to the bottom of the mould, where the concrete is emptied and the container is again drawn up to be filled again, this process being repeated until the mould is filled to the desired level. Thereafter the concrete is left to harden. During the filling of the mould, the concrete mass is preferably vibrated in known manner.

When the concrete has hardened, the mould portions must be loosened from the cast pole. Because of the washer 11 there is a little space left between the lower end edge of the lower mould elements 1 and 2 and the mould point 9. By replacing the mould hat 13 by another appropriate intermediate element it is easily possible to action only one of the mould halves with the pile driver and to drive said half 1 cm. lower than the other, whereby it loosens from the pole. The same process is thereafter repeated with the other mould half. Then, by using appropriate fastening members for the upper ends of the mould portions these can be pulled out upwards, preferably one at a time. Fig. 8 shows diagrammatically how the left mould half in the drawing is loosened and is partially pulled out. From the same figure it can also be seen, how the lower end of the pole has been anchored in an inclined ground rock surface by means of the pin 19.

As illustrated in the drawing, the joints between the different mould portions have greater thickness than the mould itself because of the claws 4 and 5. To facilitate the driving down of the mould the upper wider end of the mould point 9 has preferably a greater diameter than said joints. Theoretically a cylindrical space will be formed around the mould, which space however at the pulling out of the mould portions will be filled by particles of sand and earth falling down into said space. If desired, the mould can be pulled out only ⅔ of its length, whereafter it can be left in this position for one day or the like so as to permit the surrounding ground material to pack itself around the larger part of the length of the pole.

Figure 9:
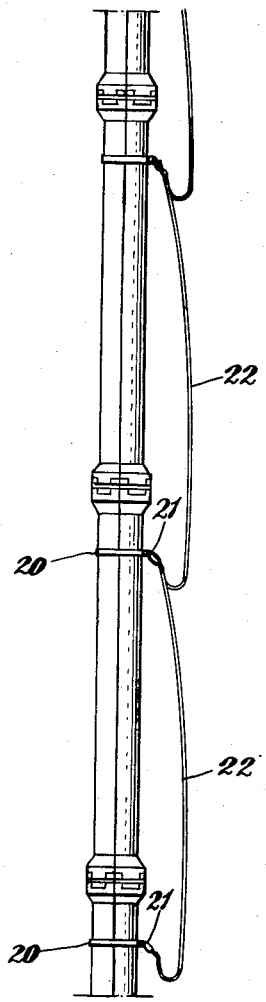
Fig. 9 illustrates a mould according to the invention provided with special locking means.

In most cases the surrounding ground will maintain both mould portions together with sufficient force during the driving of the pole. If desired the mould halves may, however, be maintained together by special means, of which an embodiment is illustrated in Fig. 9. According to this, the mould is encircled by open rings 20, the ends of which are releasably connected by a releasing member 21. All of the releasing members 21 are connected with each other by a line or chain 22 disposed in loose slings. It is seen, that the rings 20 can be opened after the casting of the pole by drawing the line or chain 22 upwards, the rings being thereby opened one after the other beginning with the uppermost of these rings. Thus the two mould halves can be disconnected from each other.

In order to make the driving down of the mould into the ground easier it is preferable to act alternatively upon the mould point and the tubular mould. A device for this purpose is illustrated in Figs. 10 to 12.

In Fig. 10, 31 designates a tubular, cylindrical mould portion, which at its lower end is connected with a mould point 32, from which two cylindrical tubular portions 33 and 34 extend upwards on both sides of the tube 31, so that the point is connected with the tube by a telescope joint. At the upper end of the tube 31 there is provided thrust pad 35, resting on the upper border of the tube preferably by an intermediate ring 36 of lead or the like.

Extending axially through the tube 31 there is a thrust rod 37, which at its lower end bears a shoe 38, adapted to cooperate with the conical inside of the point 32. The shoe 38 is provided with triangular spacing members 39 for a purpose indicated below. On the upper end of the thrust rod 37 is loosely mounted a plate 40, resting on the upper end of the rod 37 through a pad 41 of lead or the like.

At 42 there is diagrammatically shown a pile driver head having a central bore 43 of somewhat larger diameter than the diameter of the thrust rod 37. The driver head is in a manner generally known and not illustrated connected with a suspension means or the like. In the device illustrated in Fig. 10 the driver head 42 will cooperate with the plate 40 and through the bar 37 act upon the mould point 32 directly. This point will be driven down separately and the length of the thrust bar 37 is such, that the point cannot be driven too deep down, that the tube 31 will slide out of the space between the tubular portions 33 and 34 of the point. When the plate 40 has been driven downwards into contact with the pad 35, the plate is lifted away and the pile driver head 42 can act directly upon the pad 35, whereby the tube 31 is driven into the ground, as illustrated in Fig. 11. When the tube 31 has reached the bottom of the space between the tubular parts 33 and 34, the plate 40 is again placed on the rod 37 and the procedure is repeated.

By these means the mould is driven into the ground by acting alternately on the tube 31 and the point 32. The effect of the thrust from the pile driver head is thereby increased, the driving of the point 32 alone being performed without the necessity to surmount the considerable friction between the tube 31 and the surrounding ground. When the tube alone is acted upon, the resistance of the point 32 against penetration into the ground is avoided.

As shown in the drawing the thrust rod 37 is in its upper part guided by the pad 35, which is provided with a hole of approximately the same dimensions as the cross section of the rod.

To prevent any protective coating applied to the inner side of the mould 31 which coating as above mentioned may consist of fat, to be removed by the up- and downward movements of the shoe 38 through the mould, the above named spacing members 39 are adapted to guide the shoe 38 in its centered position within the mould without destroying the coating in a disastrous extent.

As previously indicated it is appropriate to take such measures, that the different portions of the tubular mould can be driven down a little distance after the hardening of the concrete by means of the driver head, whereby the mould portions are loosened from the concrete in those places where the concrete may have adhered to the mould.

It can be easily recognised that with the last described embodiment of the invention it will be easy to provide, that the tube 31 at the beginning of the casting of the concrete is at some distance from its bottom position in the mould point 32. After the concrete has hardened the mould halves can be driven together or separately downwards to obtain the desired loosening of the mould from the hardened pole.

In the foregoing description it has been stated how the lowest pointed portion of the mould point can be molten or burnt away by adapting a load of heat developing powder or the like.

Figs. 13 and 14 illustrate further embodiments of mould points, which are constructed in such manner, that the points can be removed by blasting.

In Fig. 13, 51 and 52 designate two semicylindrical halves of a mould, which are inserted in mould point 53 in form of a truncated cone and having two cylindrical portions 54 and 55 serving as guide members for the mould halves 51 and 52.

To the narrower end of the truncated conical mould point is attached a cylindrical sleeve 56, which forms a recess adapted to contain an explosive load. This sleeve may be formed of a piece of steel tube having walls of less thickness than the truncated conical portion of the mould point. In this cylindrical sleeve is at a little distance from its lower free end inserted an arched bottom piece 57 having its convex side turned downwards towards the free end of the sleeve and being made of a material of less resistance than the sleeve, such as of thin iron plate.

To facilitate the bursting of the lower end portion of the mould point the cylindrical sleeve is provided with axial slots 58, extending from the bottom piece 57 to the free end of the sleeve.

In the embodiment of a such device illustrated in Fig.

14 the truncated conical mould point 59 has an extension 60 in the form of a cone having the same conicity as the mould point but being made of a material of less resistance than the mould point. The embodiment illustrated in Fig. 14 is adapted for use in the case the pole mould is not to be driven down to rock ground but an enlarged base for the pole is to be moulded, which can be formed after the point has been removed.

The device is intended to work in the following manner:

After a hole has been bored in the ground for determining the constitution of the different ground layers and in certain cases the depth of the rock ground, which hole has a larger diameter than the feebler portion of the mould point, the mould is driven down to the desired depth with a mould point of a form adapted to the ground conditions at the foot of the pole. Thereafter a quantity of explosive material—such as dynamite—determined by experience is lowered into the mould point and ignited, whereby the feebler top portion of the point is blasted away. The explosive load must previously be dammed up, which appropriately is effected by filling water at least into the lower part of the point. Then it will be possible by means of optical examining instruments to determine if the blasting has had the desired effect and if this is the case, the boring of the rock ground may be effected in a known manner to enable the insertion of a locking pin, whereafter concrete is poured into the mould as described with reference to Figs. 1–7.

The invention is not limited to the embodiments above described and illustrated in the drawings and may be subjected to modifications within the scope of the appending claims.

What I claim is:

1. A mould for moulding a concrete pole within a cavity in the ground, comprising at least two longitudinal mould members, means to hold said members together to form a tube, a detachable earth piercing shoe at one end of said tube, a removable spacing washer between the lower end of the tube and the shoe, said washer adapted to be removed after said tube has been driven down to the desired depth in the ground whereby to permit said mould members after the hardening of the pole to be driven further downwardly in order to loosen said members from the concrete pole.

2. A mould according to claim 1, in which the central portion of the shoe has less mechanical strength than the rest of the shoe.

3. A mould according to claim 2, in which said shoe has a form of a truncated cone, from the narrower end of which extends a cylindrical sleeve made from thinner material than the truncated cone, and a bottom plate of less mechanical strength than said cylindrical sleeve being inserted within said sleeve.

References Cited in the file of this patent

UNITED STATES PATENTS

| | | |
|---|---|---|
| 75,766 | Judge | Mar. 24, 1868 |
| 985,549 | Raymond | Feb. 28, 1911 |
| 1,106,606 | Wilhelmi | Aug. 11, 1914 |
| 1,164,085 | Goldsborough | Dec. 14, 1915 |
| 1,202,134 | White et al. | Oct. 24, 1916 |
| 1,411,404 | Camp | Apr. 4, 1922 |
| 1,449,032 | Blumenthal | Mar. 20, 1923 |
| 1,449,236 | Malone | Mar. 20, 1923 |
| 1,454,434 | Gardner | May 8, 1923 |
| 1,558,127 | Upson | Oct. 20, 1925 |
| 1,629,947 | Blumenthal | Mar. 24, 1927 |
| 1,786,968 | Upson | Dec. 30, 1930 |
| 1,822,550 | Thornley | Sept. 8, 1931 |
| 1,865,652 | Upson | July 5, 1932 |
| 1,865,658 | Watt | July 5, 1932 |
| 2,230,778 | Flores | Feb. 4, 1941 |
| 2,391,828 | Hood | Dec. 25, 1945 |